United States Patent
Chang

(10) Patent No.: US 8,442,350 B2
(45) Date of Patent: May 14, 2013

(54) EDGE PARAMETER COMPUTING METHOD FOR IMAGE AND IMAGE NOISE OMITTING METHOD UTILIZING THE EDGE PARAMETER COMPUTING METHOD

(75) Inventor: Chun-Wen Chang, Taipei County (TW)

(73) Assignees: Silicon Motion Inc., keji Chuangyeyuan, Tianan Digital, Futian, Shenzhen, Guangdong (CN); Silicon Motion Inc., Jhubei, Hsinchu County (TW)

( * ) Notice: Subject to any disclaimer, the term of this patent is extended or adjusted under 35 U.S.C. 154(b) by 863 days.

(21) Appl. No.: 12/574,704

(22) Filed: Oct. 7, 2009

(65) Prior Publication Data
US 2010/0303378 A1    Dec. 2, 2010

(30) Foreign Application Priority Data

May 26, 2009   (TW) ............................... 98117501 A

(51) Int. Cl.
*G06K 9/40*   (2006.01)
(52) U.S. Cl.
USPC ........... 382/275; 382/254; 382/266; 382/272; 382/273; 382/274

(58) Field of Classification Search ................... 382/254, 382/266, 270–275
See application file for complete search history.

(56) References Cited

U.S. PATENT DOCUMENTS

| | | | | |
|---|---|---|---|---|
| 5,031,227 | A * | 7/1991 | Raasch et al. ................. | 382/205 |
| 5,844,614 | A * | 12/1998 | Chong et al. .................. | 348/699 |
| 6,094,508 | A * | 7/2000 | Acharya et al. ............... | 382/272 |
| 6,343,099 | B1 * | 1/2002 | Ogura ........................... | 348/699 |
| 7,349,574 | B1 * | 3/2008 | Sodini et al. .................. | 382/168 |
| 2009/0116738 | A1 * | 5/2009 | Kubota .......................... | 382/165 |

* cited by examiner

*Primary Examiner* — Eric Rush
(74) *Attorney, Agent, or Firm* — Winston Hsu; Scott Margo

(57) ABSTRACT

An edge parameter computing method for an image, wherein the image includes a plurality of pixels forming a Bayer pattern. The edge parameter computing method comprises: (a) computing an average grey level of at least one specific type pixels in a specific region of the image; (b) computing each grey level difference value between the average grey level and the specific type pixels in the specific region to generate a plurality of grey level difference values; (c) finding a specific pixel with a maximum grey level difference value according to the grey level difference values; and (d) computing a ratio value between the average grey level and the maximum grey level difference value as the edge parameter.

13 Claims, 6 Drawing Sheets

| $B_7$ | G | $B_0$ | G | $B_1$ |
|---|---|---|---|---|
| G | R | G | R | G |
| $B_6$ | G | $B_t$ | G | $B_2$ |
| G | R | G | R | G |
| $B_5$ | G | $B_4$ | G | $B_3$ |

FIG. 2b PRIOR ART

| $G_{11}$ | R | $G_0$ | R | $G_8$ |
|---|---|---|---|---|
| B | $G_7$ | B | $G_1$ | B |
| $G_6$ | R | $G_t$ | R | $G_2$ |
| B | $G_5$ | B | $G_3$ | B |
| $G_{10}$ | R | $G_4$ | R | $G_9$ |

FIG. 2c PRIOR ART

EDGE PARAMETER COMPUTING METHOD FOR IMAGE AND IMAGE NOISE OMITTING METHOD UTILIZING THE EDGE PARAMETER COMPUTING METHOD

BACKGROUND OF THE INVENTION

1. Field of the Invention

The present invention relates to an edge parameter computing method for image and an image noise omitting method utilizing the edge parameter computing method, and particularly relates to an edge parameter computing method and a image noise omitting method utilizing different weighting processes according to the edge parameter.

2. Description of the Prior Art

FIG. 1 is a block diagram illustrating a prior art image processing system 100. As shown in FIG. 1, the image processing system 100 comprises an image sensor 101 such as a CCD (Charge-coupled Device), an analog amplifier 103, an analog-digital converter 105 and an image processing module 107. The image sensor 101 is utilized to sense input light from a target (i.e. an analog image signal AIS), and to transform input light intensity to charge intensity (i.e. a sampling image signal SIS). After that, the analog amplifier 103 amplifies the sampling image signal SIS to generate an amplified sampling image signal ASIS. After that, the analog-digital converter 105 transforms the amplified sampling image signal ASIS to a digital image signal $S_{RGB}$ with RGB format. The image processing module 107 transforms the digital image signal $S_{RGB}$ with RGB format to a digital image signal $S_{YUV}$ with YUV format, and transmits the digital image signal $S_{YUV}$ to the displaying apparatus 109 for displaying. Alternatively, the digital image signal $S_{YUV}$ can be transmitted to the compression processing module 111 for compression and then stored to the storage apparatus 113. The image processing module 107 described here can be implemented by every hardware or software that image processing may utilizes, such as format transforming, interpretation processing, encoding/decoding. Since such skill is known by persons skilled in the art, it is omitted for brevity here.

FIG. 2 is a schematic diagram illustrating a prior art Bayer Pattern. The Bayer Pattern is an arrangement format for a color filter array in am image sensor. As shown in FIG. 2a, Bayer Pattern includes specific arrangement. For example, the arrangement for the first column 201 is RGRGR, the arrangement for the second column 203 is GBGBG, and the arrangement for the third column 205 is RGRGR again. FIGS. 2b, 2c also illustrate Bayer Pattern. FIGS. 2b, 2c have the same arrangement of FIG. 2a, and the difference between FIGS. 2a, 2b, 2c is that FIG. 2a utilizes an R pixel as a center, but FIGS. 2b, 2c utilize B, G pixels as a center.

However, disclosed prior art does not provide a special processing for image noise, or the noise processing is performed but it consumes large amount of system resource and time.

SUMMARY OF THE INVENTION

Accordingly, one objective of the present invention is to provide an image noise omitting method, to omit the noise in the image.

Another objective of the present invention is to provide an edge parameter computing method for an image.

One embodiment of the present application discloses an method for computing an edge parameter of an image, wherein the image includes a plurality of pixels forming a Bayer pattern. The edge parameter computing method comprises: (a) computing an average grey level of at least one specific type pixels in a specific region of the image; (b) computing each grey level difference value between the average grey level and the specific type pixels in the specific region to generate a plurality of grey level difference values; (c) finding a specific pixel with a maximum grey level difference value according to the grey level difference values; and (d) computing a ratio value between the average grey level and the maximum grey level difference value as the edge parameter.

Another embodiment of the present application discloses a noise omitting method for an image, wherein the image includes a plurality of pixels forming a Bayer pattern. The edge parameter computing method comprises: (a) computing an average grey level of at least one of specific type pixels in a first region of the image; (b) computing each grey level difference between the average grey level and the specific type pixels to generate a plurality of grey level difference values; (c) finding a specific pixel with a maximum grey level difference value according to the grey level difference values; and (d) determining a second region according to the specific pixel and a target pixel in the first region; and (e) selectively utilizing the pixel in the second region to adjust a grey level value of the target pixel to omit noise.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2a, 2b, 2c are schematic diagrams illustrating a prior art Bayer Pattern.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 3:
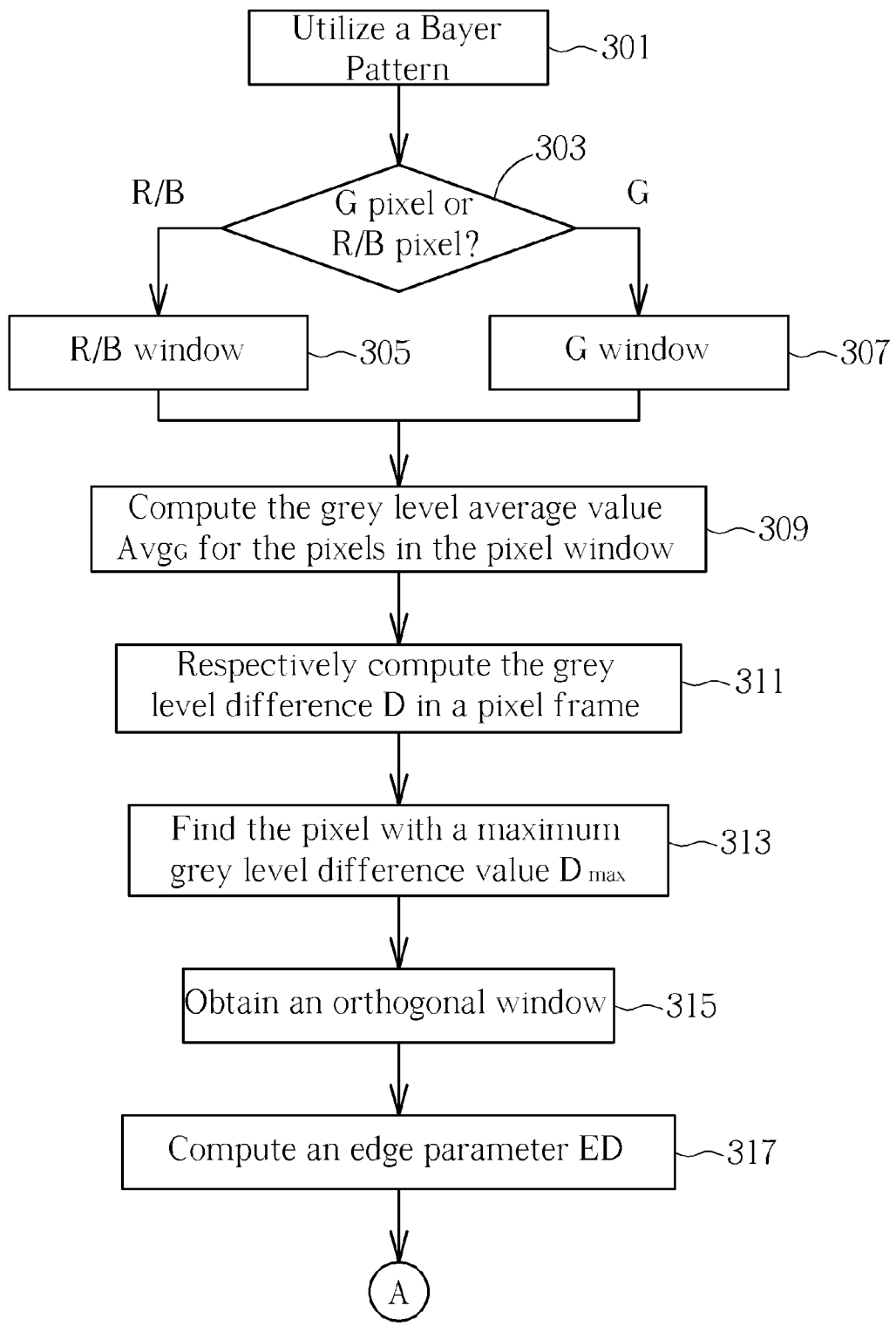
FIGS. 3,4 respectively describe part of the flow chart for the image noise omitting method according the embodiment of the present application.
Figure 4:
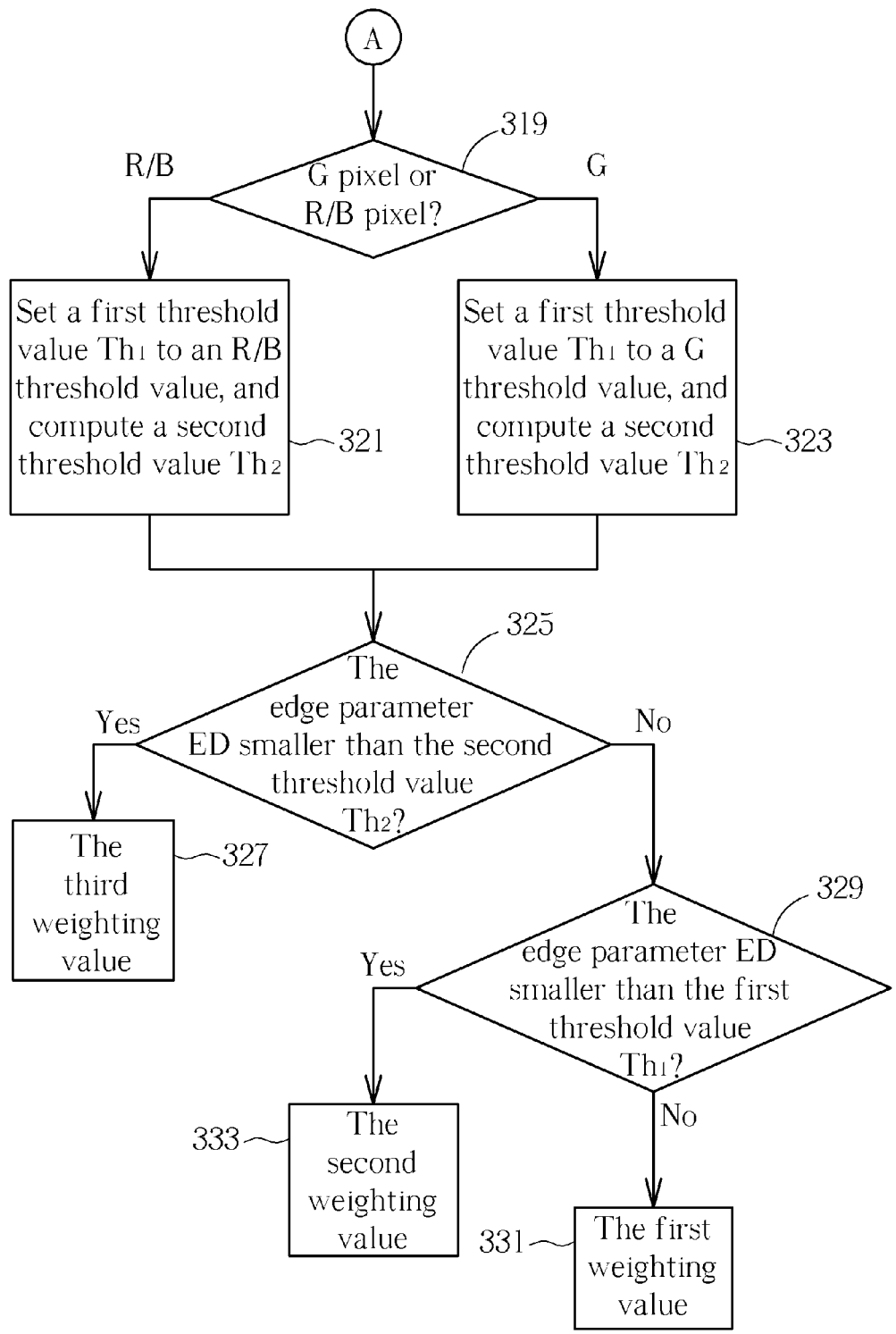

FIG. 3 and FIG. 4 respectively illustrate part of the flow charts of the image noise omitting method according to one embodiment of the present invention. Please jointly refer to these two figures to understand the present invention more clearly. The image noise omitting method according to one embodiment of the present invention can be applied in the image processing module 107 via software, firmware or hardware.

FIG. 3 can include following steps:

Step 301

Utilize a Bayer Pattern.

Step 303

Determine the pixel to be performed by a noise omitting process (i.e. a target pixel) belongs to a G pixel or one of the R/B pixels. If the target pixel belongs to a G pixel, go to step 307, and if the target pixel belongs to the R pixel or B pixel, go to step 305. For more detail, determining the pixel at the center of Bayer Pattern is a G or R/B pixel, while determining the target pixel. Take FIGS. 2a, 2b for example, the pixel at the center of Bayer Pattern are R/B pixels ($R_t/B_t$), and then the step 305 is performed. Take FIG. 2c for example, the pixel at the center of Bayer Pattern is a G pixel ($G_t$), and then the step 307 is performed.

Step 305

Utilize an R/B window. Take FIG. 2a for example, the R window indicates 8 R pixels closest to the target pixel $R_t$, that is, $R_0$~$R_7$. Take FIG. 2b for example, the B window indicates 8 R pixels closest to the target pixel $B_t$, that is, $B_0$~$B_7$. The B pixel and the R pixel have the same corresponding locations with the target pixel in Bayer pattern, thus such format is called the R/B window.

Step 307

Utilize a G window. Take FIG. 2c for example, the G window indicates 12 G pixels closest to the target pixel $G_t$, that is, $G_0$~$G_{11}$.

Step 309

Utilize one of the G window or R/B window to compute the grey level average value $Avg_G$ of the pixels in the pixel window. Take G window for example, the grey level average value $Avg_G$ of the pixels $G_0$~$G_{11}$ are computed. Take the R window for example, the grey level average value $Avg_R$ of the pixels $R_0$~$R_7$ are computed. Take the B window for example, the grey level average value $Avg_B$ of the pixels $B_0$~$B_7$ are computed.

Step 311

Respectively compute the grey level difference value D between a gray level of a plurality of pixels in a window (part or all of the pixels) and the average grey level value Avg. Take the G window for example, the differences $D_{G0}$~$D_{G11}$ between the pixels $G_0$~$G_{11}$ and the average grey level value $Avg_G$ are all computed, or only the differences $D_{G0}$~$D_{G7}$ between the pixels $G_0$~$G_7$ and the average grey level value $Avg_G$ are computed. Take the R window for example, the differences $D_{R0}$~$D_{R7}$ between the pixels $R_0$~$R_7$ and the average grey level value $Avg_R$ are computed. Take the B window for example, the differences $D_{B0}$~$D_{B7}$ between the pixels $B_0$~$B_7$ and the average grey level value $Avg_B$ are computed.

Step 313

Find the pixel with a maximum grey level difference value $D_{max}$ and mark the location. For example, if the maximum value in $D_{R0}$~$D_{R7}$ is $D_{R1}$ then it is determined to be $D_{max}$, and the pixel $R_1$ is marked. An edge is supposed to exist between the pixel $R_1$ and the pixel $R_t$, since the pixel $R_1$ has a maximum value comparing with the average grey level value $Avg_R$.

Step 315

Obtain an orthogonal window according to the information from the step 313, and utilize the orthogonal window to perform weighting process in a direction toward the pixel with a maximum grey level difference value $D_{max}$. For example, in the step 313, the pixel $R_1$, which has a maximum difference $D_{R1}$ comparing with the average grey level value Avg is obtained. Then an orthogonal window such as a window comprising $R_3$, $R_t$, $R_7$, is build according to a normal vector of a line connected by the pixels $R_1$ and $R_t$.

Step 317

Compute an edge parameter ED.

Such edge parameter ED indicates the edge intensity of the direction that the orthogonal window processes toward. A larger value indicates that the image has an apparent edge in this direction (or called a strong edge). Oppositely, a smaller value indicates that the image has an unapparent edge in this direction (or called a weak edge). The reason for computing such edge parameter ED is that noise or processing error easily occurs at edges. Accordingly, different weighting processing must be applied to apparent edges, unapparent edges or non edges, this processing will be described as follows:

In this embodiment, a method for computing edge parameter is provided, which can be expressed as following Equation (1):

$$ED = D_{max}/Avg \qquad \text{Equation (1)}$$

As described above, ED is edge parameter, $D_{max}$ is the maximum grey level difference value, and Avg is the average grey level value. The reason for utilizing Equation (1) to indicate edge parameter is described as follows. An apparent edge may exist if the maximum grey level difference value $D_{max}$ is larger than the average grey level value Avg. For example, a chair is located in front of a wall, then an apparent edge will exist at the interface of the chair and the wall, and the grey level of the pixels among the chair and the wall will have different values. Oppositely, an unapparent edge may exist, or no edge exists, if the maximum grey level difference value $D_{max}$ is smaller than the average grey level value Avg. For example, there is no edge on a wall, and the grey level of the wall will have similar values. Therefore, an apparent edge can be determined to exist or not, according to a ratio between the $D_{max}$ and Avg even both values are small, according to Equation (1).

Please refer to FIG. 4 to understand following steps, the step 317 in FIG. 3 continues to the step 319 of FIG. 4.

Step 319

Determine whether the target pixel belongs to G pixel or one of R/B pixels. If belonging to G pixel, go to step 321. If belonging to one of the R/B pixels, go to step 323.

Step 321

Set a first threshold value $Th_1$ to an R/B threshold value, and compute a second threshold value $Th_2$ according to the first threshold value $Th_1$. The setting of the threshold value will be described as follows.

Step 323

Set a first threshold value $Th_1$ to a G threshold value, and compute a second threshold value $Th_2$ according to the first threshold value $Th_1$. The setting of the threshold value will be described as follows.

Generally speaking, the noise levels are different for G pixel and R/B pixel. Accordingly, different threshold values must be set according to the type of the target pixel (a G pixel or an R/B pixel). The noise level for R/B pixel is always larger than which of the G pixel, thus the threshold value of the R/B pixel is preferably larger than which of the G pixel. In this embodiment, the second threshold value $Th_2$ equals to first threshold value $Th_1$ subtracting an offset value, which can be generated according to the state of edge. Besides, it should be noted that the first and second in the specification and following claims of the present application indicate that they are different signals or parameters instead of indicating the order thereof.

Step 325

Determine whether the edge parameter ED is smaller than the second threshold value $Th_2$. If yes, go to step 327. If no, go to step 329.

Step 327

Utilize the third weighting value and an orthogonal window in the step 315 to perform weighting processing to the pixels in the orthogonal window. In this embodiment, it indicates no edge exist if the edge parameter ED is smaller than the second threshold value Th2. Thus, a weighting value suitable for the non edge region is applied in this case.

Step 329

Determine whether the edge parameter ED is smaller than the first threshold value $Th_1$. If yes, go to step 333. If not, go to step 331.

Step 331

Utilize the first weighting value and the orthogonal window in the step 315, to perform weighting processing to the pixels in the orthogonal window. In this embodiment, an apparent edge (or called a strong edge) may exists if the edge parameter ED is larger than the first threshold value $Th_1$. Thus, a weighting value suitable for the apparent edge region is applied in this case.

Step 333

Utilize the second weighting value and the orthogonal window in the step 315, to perform weighting processing to the pixels in the orthogonal window. In this embodiment, an unapparent edge (or called a weak edge) may exists if the edge parameter ED is larger than the first threshold value $Th_1$. Thus, a weighting value suitable for the unapparent edge region is applied in this case.

Figure 2A:
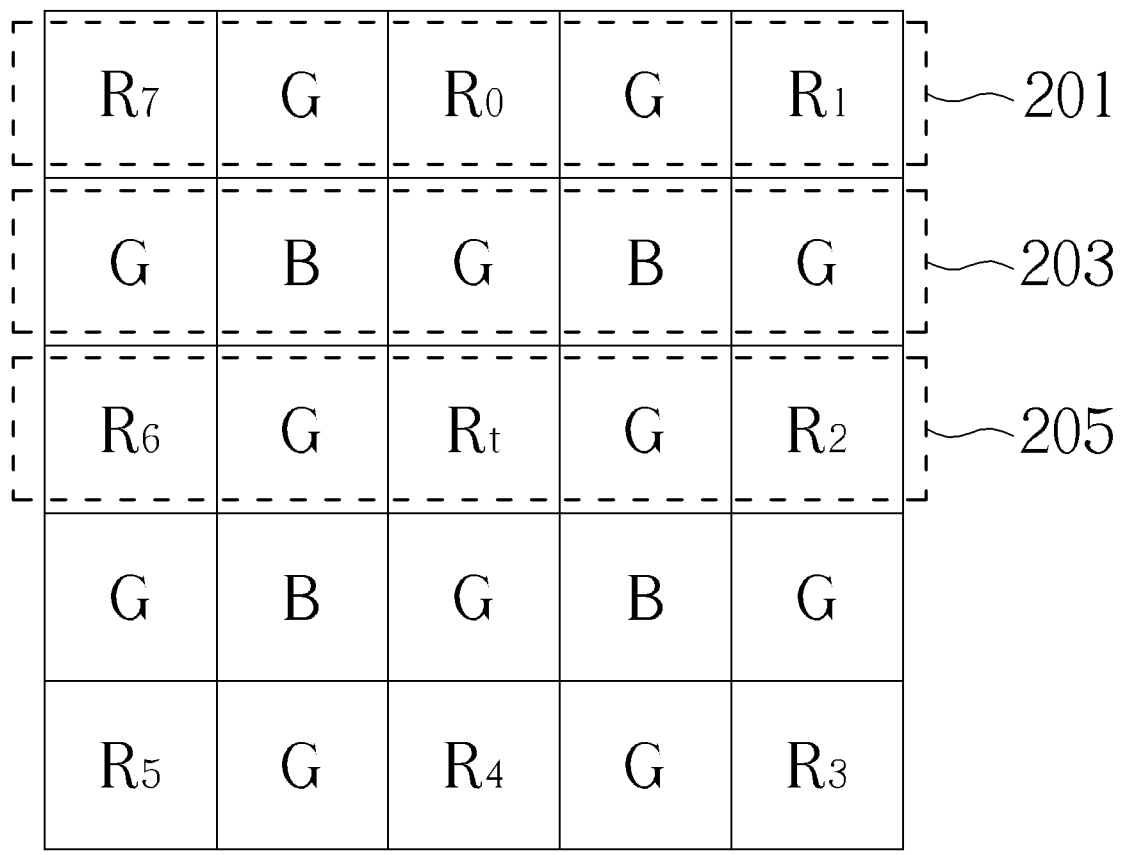

The weighting function according to the embodiment of the present invention will be described as follows. The weighting function is utilized in steps 327, 331 and 333 to compute weighted grey level value. The pixels R1, R3 and R7 shown in FIG. 2a are taken as example for description:

Weighted grey level value $R_t'$ of the target pixel=$W_t$*$(R_7+R_3)$+$(1-W_t)$*$R_t$=$W_t(R_7+R_3-R_t)$+$R_t$      Equation (2)

The weighted grey level value from equation (2) can be applied to all R pixels in the orthogonal window of the step 315, to increase noise elimination. However, in another embodiment, such weighted grey level value can be applied to the target pixel $R_t$ only.

In one embodiment, the third weighting value in the step 327 can be 0, that is, $W_t$=0. Since the edge parameter ED is smaller than the second threshold value $Th_2$, it is inferred that the Bayer pattern does not exist any edge (i.e. the region is non edge region). Thus, the grey level value of the target pixel $R_t$ is not needed to be amended, the weighted grey level value $R_t'$ can be directly set to the grey level value of the target pixel $R_t$.

In one embodiment, the first weighting value in the step 331 is 0.9, that is, $W_t$=0.1. Since the edge parameter ED is larger than the first threshold value $Th_1$, it is inferred that an apparent edge exists between the target pixel $R_t$ and the pixel $R_1$ (i.e. the region is a strong edge region). Accordingly, the amendment grey level value of the target pixel $R_t$ has a close relation ship with the grey level values of pixels $R_3$ and $R_7$.

In one embodiment, the second weighting value in the step 333 is 0.3, that is, $W_t$=0.3. Since the edge parameter ED is between the first threshold value $Th_1$ and second threshold value $Th_2$, it is inferred that an unapparent edge exists between the target pixel $R_t$ and the pixel $R_1$ (i.e. the region is a weak edge region). Accordingly, the grey level values of pixels Rt, $R_3$ and $R_7$ can be referred when amend the grey level value of the target pixel $R_t$.

It should be noted that the Equation (2) is not limited to be applied to R pixel, other pixels such as B pixel or G pixel can be applied to Equation (2). Also, the first, the second, and the third weighting values are not limited to 0, 0.9, and 0.3.

It should be noted that above-mentioned embodiment is only for example and does not meant to limit the scope of the present application. For example, the above mentioned embodiments can be utilized to other patterns besides the Bayer pattern, and other pixels besides RGB pixels such as YUV or other pixels. Besides, it is not limited that different regions must be utilized to process different types of pixels, that is, the steps 303, 305 and 307 can be omitted. Additionally, it is not limited that different threshold values must be utilized to process different types of pixels, that is, steps 319, 321 and 323 can be omitted. Additionally, it is not limited that two threshold values must be utilized to separate the strong edge region, the weak edge region and the non edge region. For example, steps 329 and 333 can be omitted and only the non edge region (step 327) and the edge region (step 331) are classified. Alternatively, the step 327 can be omitted and only the strong edge region (step 331) and the weak edge region (step 333) are classified. Such variation should also be included in the scope of the present invention.

Figure 1:
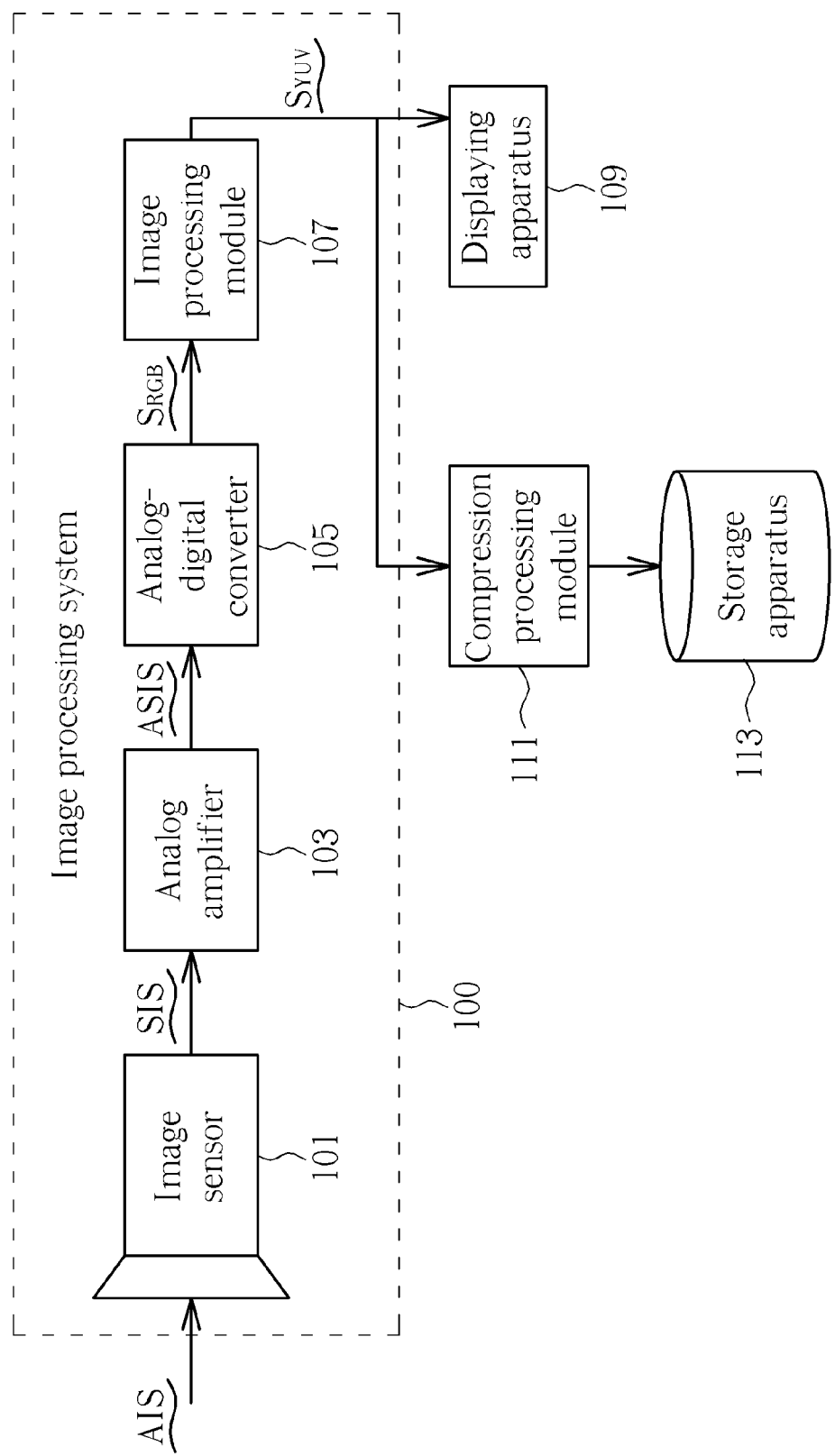
FIG. 1 is a block diagram illustrating a prior art image processing system.

Please refer to FIG. 1 again, a noise omitting module can be applied for implementation when the above-mentioned method embodiments are applied to the image processing system 100 shown in FIG. 1. Such noise omitting module can be located between the analog to digital converter 105 and the image processing module 107, or beyond the image processing module 107.

According to above mentioned embodiment, a plurality of edge parameters can be computed and weighting operations with different weighting values are performed to different edges, such that the noise can be reduced.

Those skilled in the art will readily observe that numerous modifications and alterations of the device and method may be made while retaining the teachings of the invention.

What is claimed is:

1. A noise omitting method for an image, wherein the image includes a plurality of pixels forming a Bayer pattern, where the method comprises:
   (a) computing an average grey level of at least one specific type pixels in a first region of the image;
   (b) computing each grey level difference between the average grey level and the specific type pixels to generate a plurality of grey level difference values;
   (c) finding a specific pixel with a maximum grey level difference value according to the grey level difference values;
   (d) determining a second region according to the specific pixel and a target pixel in the first region; and
   (e) selectively utilizing a pixel in the second region to adjust a grey level value of the target pixel to omit noise.

2. The method of claim 1, wherein the target pixel is at a center of the first region, and the second region is formed according to a normal vector extended from a line formed by the target pixel and the specific pixel.

3. The method of claim 2, wherein the second region comprises a plurality of pixels, which have the same type as the target pixel and are closest to the target pixel.

4. The method of claim 1, wherein the step (e) further comprises:
   (f) computing an edge parameter; and
   (g) utilizing a first weighting value to perform a weighting process to the grey level value of the target pixel if the edge parameter is larger than a first threshold value, and utilizing a second weighting value to perform the weighting process to the grey level value of the target pixel if the edge parameter is smaller than the first threshold value.

5. The method of claim 4, wherein the step (f) further comprises computing a ratio value between the average grey level and the maximum grey level difference value to obtain the edge parameter.

6. The method of claim 1, wherein the specific type pixels are one of Y pixels, U pixels, and V pixels.

7. The method of claim 1, wherein the specific type pixels are one of R pixels, G pixels, and B pixels.

8. The method of claim 4, further comprising: setting the first threshold value according to a type of the specific type pixels.

9. The method of claim 4, wherein the first threshold value is set to be larger when the specific type pixels are R pixels or B pixels, where the first threshold value is set to be smaller when the specific type pixels are G pixels.

10. The method of claim 4, further comprising utilizing a third weighting value to perform the weighting process, when the edge parameter is smaller than a second threshold value, wherein the second threshold value is smaller than the first threshold value.

11. The method of claim 10, wherein the second threshold value equals the first threshold value minus an offset value.

12. The method of claim 4, further comprising: utilizing the second weighting value to perform the weighting processing when the edge parameter is smaller than the first threshold value and larger than a second threshold value, and utilizing a third threshold value for the weighting process when the edge parameter is smaller than the second threshold value, wherein the first threshold value is larger than the second threshold value.

13. The method of claim 4, wherein the step (g) utilizes following equation to perform the weighting processing to the grey level value of the target pixel:

a weighted grey level value of the target pixel=a weighting value*(a grey level value of a first pixel+a grey level value of a second pixel)+(1−the weighting value)*the grey level value of the target pixel, wherein the first pixel and the second pixel are in the second region.

* * * * *